June 25, 1940. G. W. WHITEHURST 2,205,705
POWER UNIT
Original Filed Aug. 27, 1935 7 Sheets-Sheet 1

Inventor
George W. Whitehurst
By Geo. P. Kimmel
Attorney

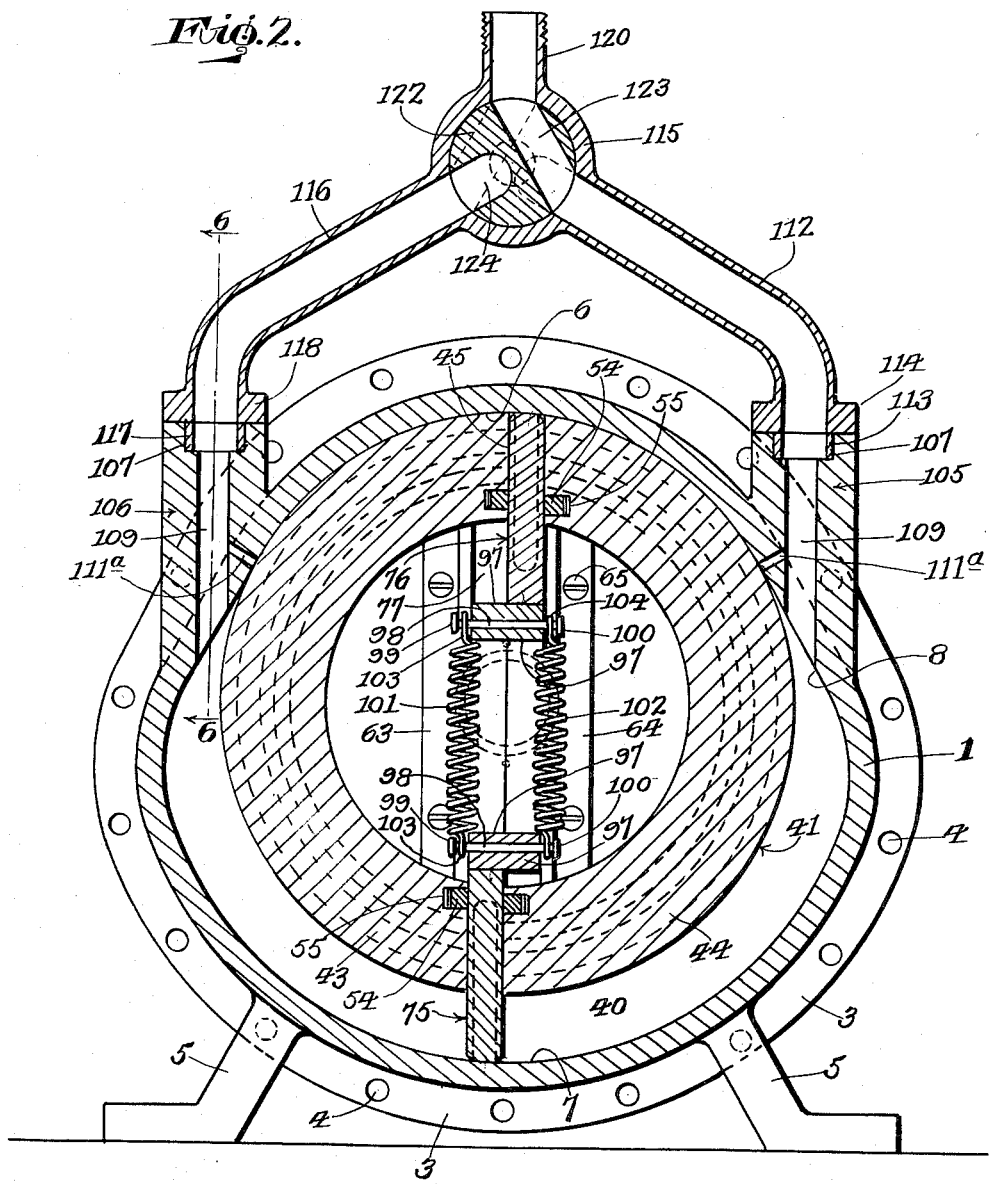

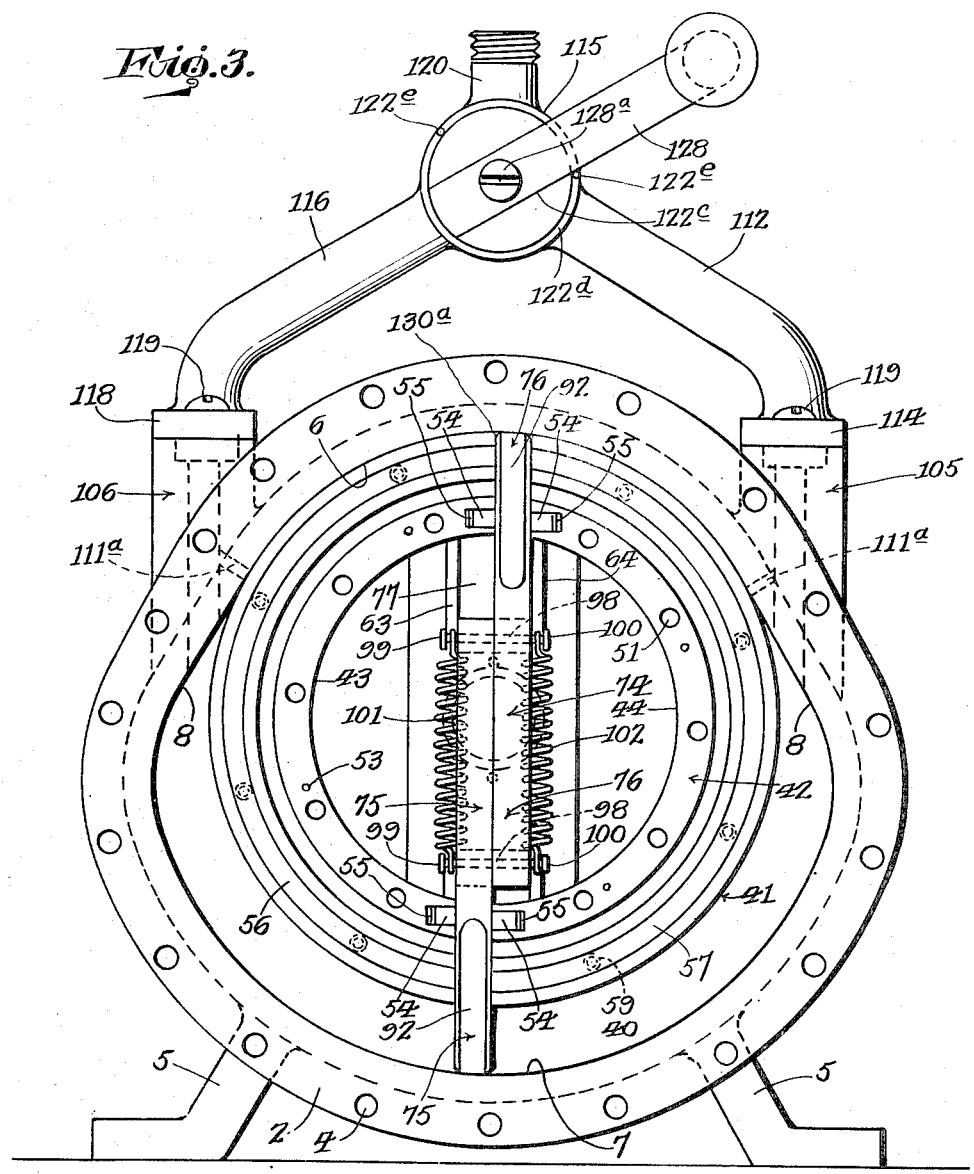

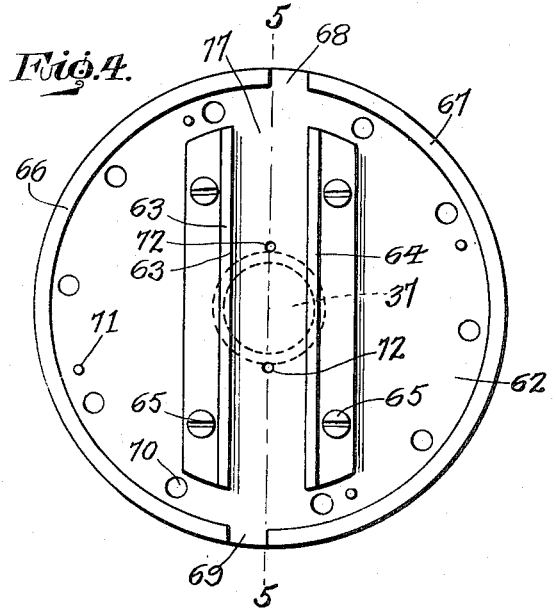
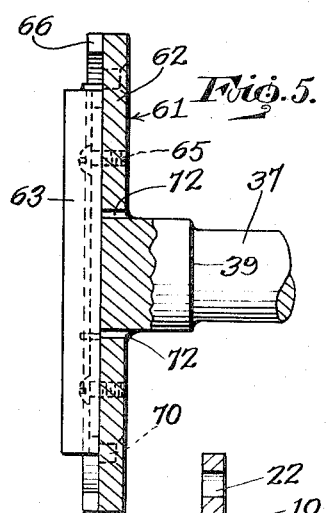
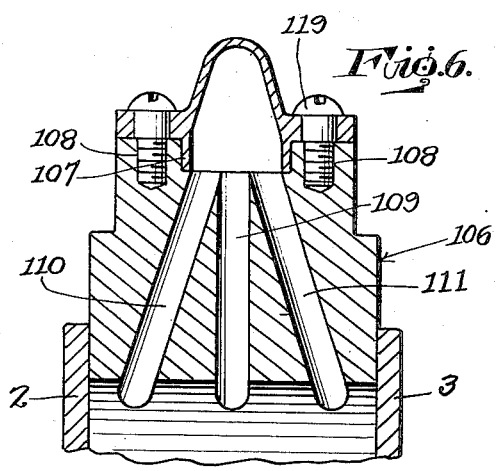
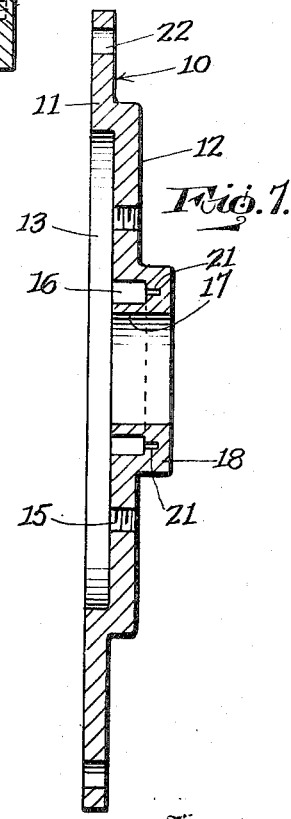
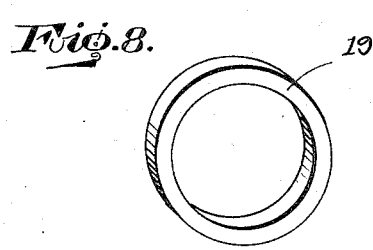

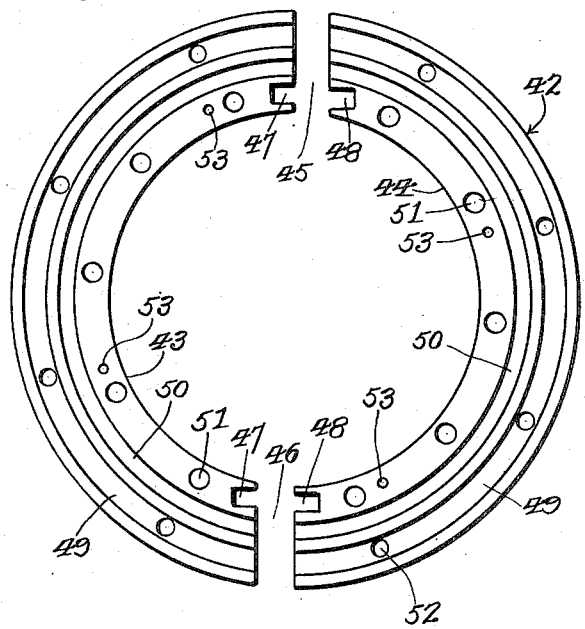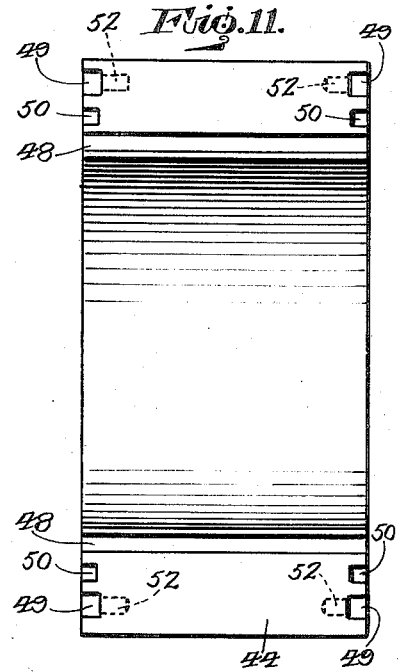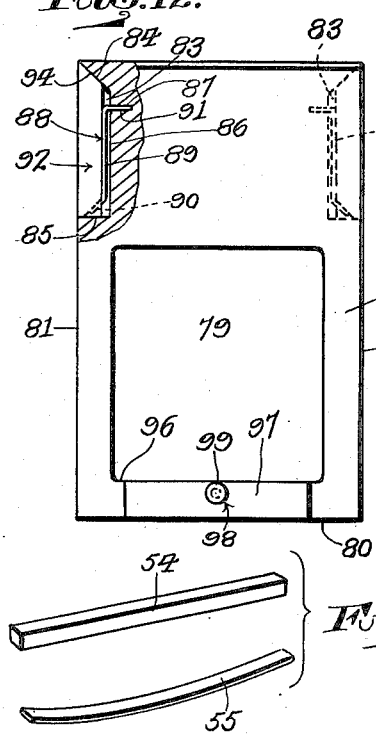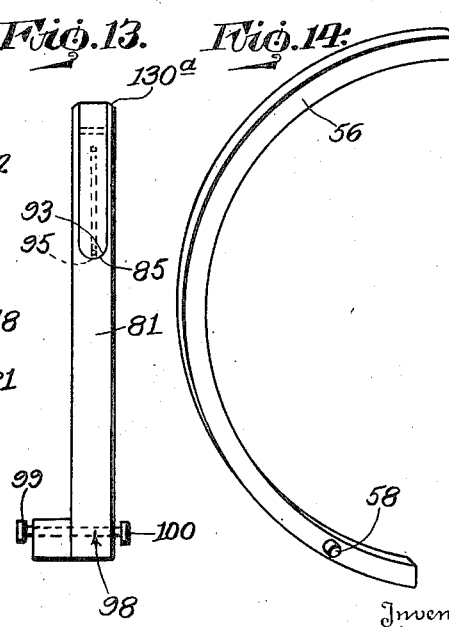

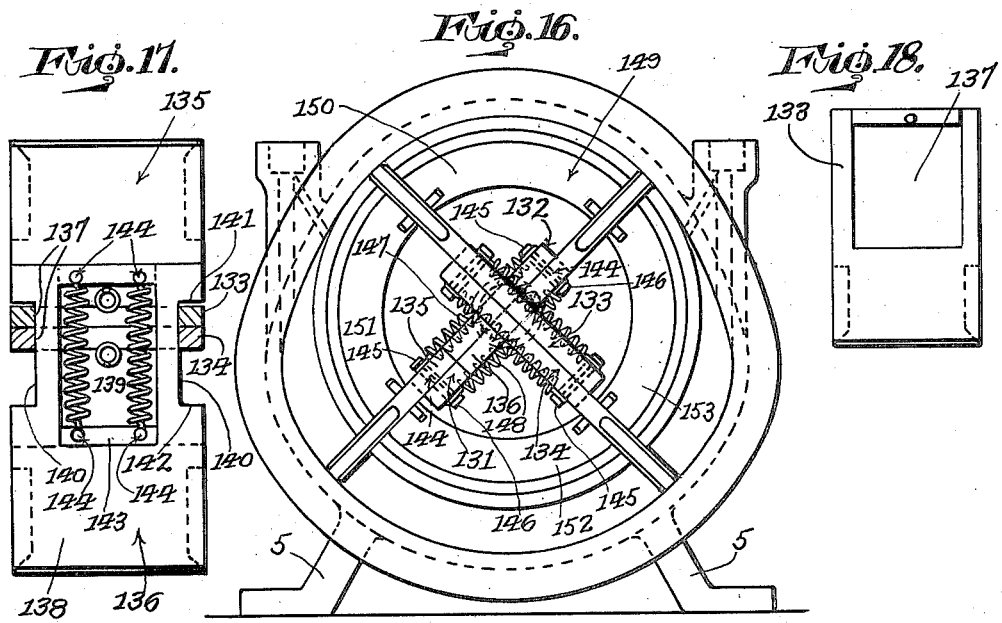

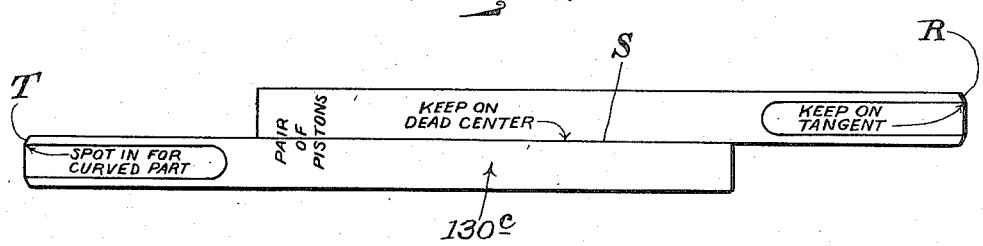
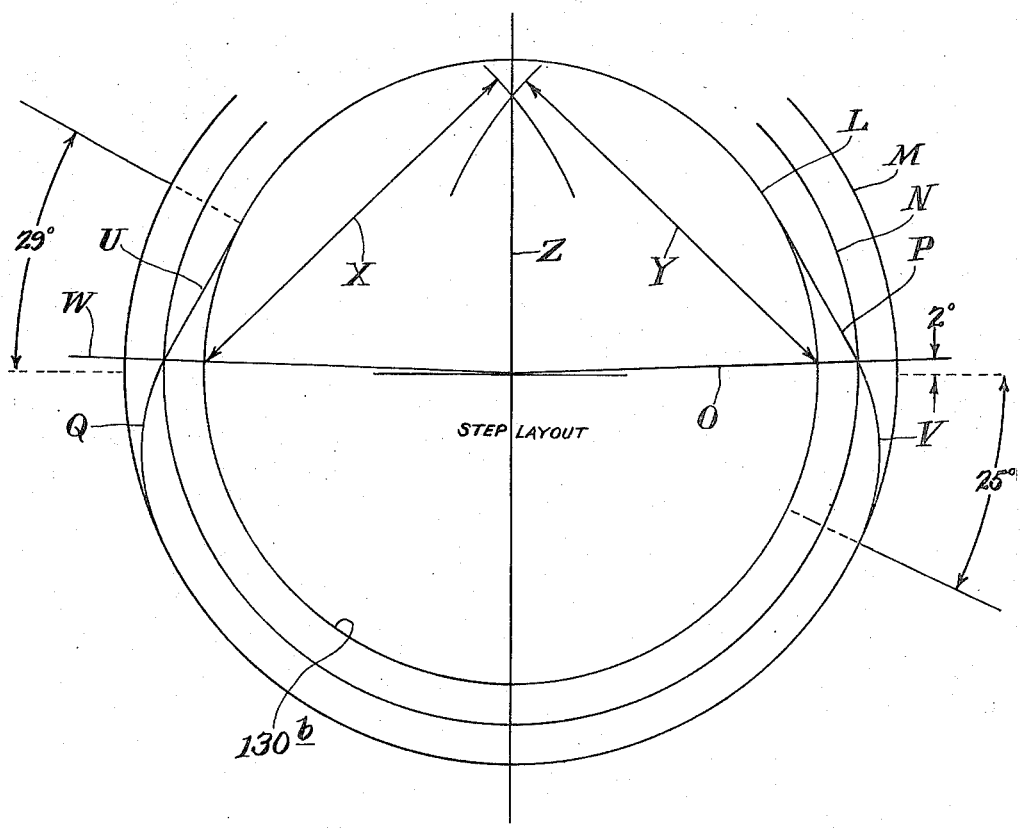

Patented June 25, 1940

2,205,705

UNITED STATES PATENT OFFICE 2,205,705

POWER UNIT

George W. Whitehurst, Portsmouth, Va.

Application August 27, 1935, Serial No. 38,126
Renewed November 13, 1939

6 Claims. (Cl. 121—82)

This invention relates to a power unit of the rotor type, and has for its object to provide, in a manner as hereinafter set forth, a unit of the class referred to for producing and delivering power steadily and continuously throughout the cycles of operation thereof.

A further object of the invention is to provide, in a manner as hereinafter set forth, a power unit including a stationary stator having the major portion of its inner face upon a pair of oppositely disposed different radii separated and connected by oppositely disposed, opposed, stepped, or irregular portions of said face thereby forming an endless surface, a rotor permanently spaced from the largest radii and continuously traversing the smallest radii, and oppositely disposed, inner facewise opposed, interengaged resiliently coupled pressure impelled vanes bodily shiftable in unison in one or the other direction, bodily carried with and operating the rotor and traversing continuously and oppositely bodily shifted by the said endless surface for producing power continuously at rotor rim speed resulting in an increase in power or output per pound of weight or cubic inch displacement.

A further object of the invention is to provide, in a manner as hereinafter set forth, a power unit of the rotor type including a stator having the major portion of its inner face upon a pair of oppositely disposed radii separated and connected by steps or irregular portions of said face to form in connection with the portions of different radii an endless surface, means in connection with said stator providing a rotor chamber having a fluid pressure intake and outlet means arranged in spaced relation, a rotor permanently spaced from the largest radii and the stepped portions and having minute clearance therebetween and the smallest radii, oppositely disposed shiftable fluid pressure impelled vanes bodily carried with and operating the rotor, continuously traversing and oppositely shiftable together by the said endless surface, alternately opening and closing the said intake and outlet means and with the structure as aforesaid, arranged to form a definite contracting and expanding area for the fluid pressure resulting in power being delivered steadily and continuously throughout the cycles of operation of the unit, as well as producing increased power or output per pound of weight or cubic inch displacement as the vane area is producing power or output continuously at rotor rim speed.

A further object of the invention is to provide, in a manner as hereinafter set forth, a power unit with a rotor, a stator having its inner surface upon two oppositely disposed different radii and stepped or irregular portions separating and connecting the portions of different radii to form an endless surface, the rotor being eccentrically mounted in the casing, permanently spaced from the largest radii and having a minute clearance therebetween and the smallest radii, and oppositely disposed, shiftable, interengaged pressure impelled vanes carried by the rotor and continuously traversing and oppositely shiftable together in one direction or the other by the said endless surface.

Further objects of the invention are to provide, in a manner as hereinafter set forth, a power unit of the rotor type which is comparatively simple in its construction and arrangement, strong, durable, compact, flexibility relative to its uses, thoroughly efficient in its use, providing for a large volume of power or output, readily assembled, reversible, conveniently controlled and comparatively inexpensive to set up.

With the foregoing and other objects which may hereinafter appear, the invention consists of a novel combination and arrangement of parts as will be hereinafter more specifically described and as are illustrated in the accompanying drawings wherein is shown an embodiment of the invention, but it is to be understood that changes, variations and modifications may be resorted to which fall within the scope of the invention as claimed.

In the drawings:

Figure 2 is a section on line 2—2, Figure 1,

Figure 1:
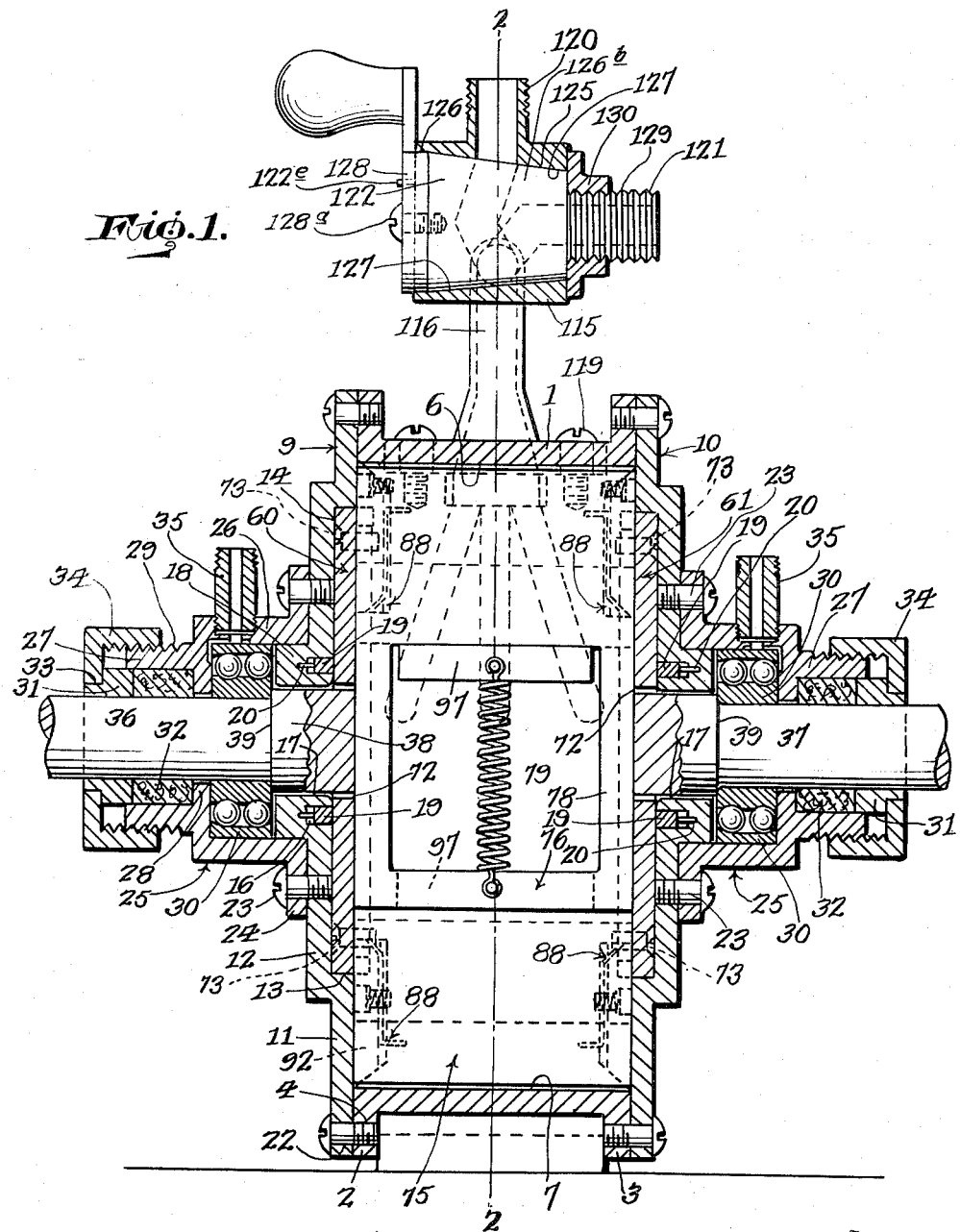
Figure 1 is a vertical sectional view of the power unit.

Figure 3 is a side elevation of the power unit with one of the stator heads or side plates removed, Figure 4 is an elevation of the rotor side plate, Figure 5 is a section on line 5—5, Figure 4, Figure 6 is a sectional detail illustrating the form of the intake or exhaust structure, on line 6—6, Figure 2, Figure 7 is a vertical sectional view of the form of side plate employed for the stator, Figure 8 is a perspective view of the form of oil sealing rings employed, Figure 9 is a perspective view of the spring member employed in connection with the oil sealing rings, Figure 10 is an elevation of the body sections of the rotor disassembled, Figure 11 is an elevation looking towards the inner face of one of the sections of the rotor, Figure 12 is an elevation partly broken away, showing the form of vane employed, Figure 13 is a side edge view of the vane, Figure 14 is a perspective view of a wearing ring section, Figure 15 illustrates in perspective, respectively, a wearing tongue and a wearing tongue spring, Figure 16 is an elevation of a modified form of power unit with the side plate removed, Figure 17 is an elevation, partly in section, of the form of vane structure employed in the construction shown in Figure 16, Figure 18 is an elevation of one of the vane elements employed in the modified form shown in Figure 16, Figure 19 is a front elevation of a template of the duplex vane structure, and Figure 20 is a diagrammatical view of the inner wall of the stator.

With reference to Figures 1 to 15, the power unit includes a housing, cylinder or stator 1, hereinafter termed a stator. The latter is open at each end and also formed at its ends with laterally disposed endless flanges 2, 3 having spaced threaded openings 4. The body of the stator 1 is of uniform thickness throughout and of less thickness than the width of the flanges 2, 3. Oppositely disposed supporting legs, of angle-shaped contour, are integral with the outer face of the bottom of the stator 1 and are designated 5.

The inner face of the stator 1 has the major portion thereof upon two oppositely disposed radii. The portion of smallest radii is indicated at 6 and the portion of largest radii at 7. The portion 6 is arranged above the portion 7. The portions 6, 7 are separated by and connected to a pair of oppositely disposed stepped or irregular shaped portions 8. The portions 8 extend inwardly from the upper ends of the portion 7. The outer face of the stator 1 conforms in contour to the inner face thereof. The flanges 2, 3 at the ends of the case 1 conform in contour to the inner and outer faces of stator 1.

A pair of oppositely disposed side or head plates of like form are employed for closing the ends of the stator 1. These plates are indicated at 9, 10, are of like construction and correspond in edge contour to the edge contour of the flanges 2, 3. Each side or head plate comprises an annular outer portion 11 and an inner circular portion 12 which overlaps, is integral with and extends inwardly from the inner edge 13 of the portion 11 thereby providing a pocket 14. The inner part 12 is formed with a plurality of threaded openings 15, an annular groove 16, an axial opening 17 and an outwardly directed collar 18 having its inner face flush with the edge of the opening 17. Arranged within the groove 16 is an oil sealing ring 19 against which bears curved forcing springs 20 having end parts extending into sockets 21 formed in collar 18. The outer portion 11 is formed with openings 22 registering with the openings 4. Headed holdfast means extend through the openings 22 and threadedly engage with the openings 4 for fixedly securing a side plate to an end flange of stator 1. Threadedly engaging with the openings 15 are holdfast means 23 for anchoring the flange 24 at the inner end of an annular holder 25 against the inner portion 12. The holder includes an inner part 26, an outer part 27 and an internal annular flange 28. The flange 24 is at the inner end of part 26 and the latter surrounds the collar 18, as well as extending outwardly therefrom. The flange 28 is integral with the outer end of the inner face of part 26. The part 27 is integral at its inner end with the flange 28 and it is of less diameter than the part 26. The part 27 is peripherally threaded as at 29. Positioned between the flange 28 and the collar 18 is a bearing structure 30. Positioned between a collar 31 and the flange 28 is a packing 32. The collar 31 is rabbeted as at 33, and bearing against the rabbet is an internally threaded flanged axially-apertured cap 34, which has threaded engagement with the threads 29 of part 27. Carried by the part 26 of holder 25 is a lubricant connection 35.

Forming a part of the unit is a power transmitting shaft consisting of a pair of oppositely extending sections 36, 37 which extend inwardly through plates 9, 10 and are connected to the rotor. The construction of the rotor and the manner in which it is connected to the sections of the power transmitting shaft will be presently referred to. A bearing structure 30, a packing 32, a collar 18 and a collar 31 encompass each shaft section. The inner end 38 of each shaft section is enlarged thereby providing a shoulder 39. The bearing structures 30 abut against the shoulders 39 of the shaft sections.

The stator 1 in connection with the side plates 9, 10 provides a rotor chamber 40. The rotor generally indicated at 41 comprises a circular body part 42 (Figure 10) formed of a pair of oppositely extending spaced endwise opposed segmental sections 43, 44 of like form. The ends of the sections 43, 44 are arranged relatively to each other to provide a pair of non-aligning passages 45, 46. The ends of the section 43, in proximity to the inner edge of the latter, are formed with transverse slots 47 which open into the passages 45, 46. The ends of the section 44, in proximity to its inner edge, are formed with transverse slots 48 which open into the passages 45, 46. The side faces of the sections 43, 44 are formed with outer grooves 49; with inner grooves 50 and with tapped openings 51 inwardly adjacent the grooves 50. The grooves 49, 50 open at the ends of sections 43, 44. The grooves 49 are of greater depth than the grooves 50. Opening into the bases of the grooves 49 are spaced sockets 52 formed within the body of sections 43, 44. The side faces of the sections 43, 44 are also formed with sockets 53. Both side faces of each of the rotor sections 43, 44 will be formed in the manner as shown in Figures 10 and 11.

Arranged within the slots 47, 48 are wearing tongues 54 seated against bow-shaped springs 55 (Figures 3 and 15) and the normal tendency of springs 55 is to force the tongues 54 from said grooves. Mounted in the grooves 49 are the split sections 56, 57 (Figures 3 and 14) of a wearing ring, the ring sections corresponding in length to that of the rotor sections and each is provided adjacent one end with a positioning pin 58. Arranged within the sockets 52 are coiled springs 59 (Figure 3) which bear against and normally tend to force the ring sections from grooves 49.

The rotor includes a pair of side coupling plates 60, 61 of like form (Figure 1). Each coupling plate includes a circular body part 62 (Figures 4 and 5) of less diameter than that of the body part 42 of the rotor. The body part 62 on its inner face has secured thereto a pair of spaced parallel guide members 63, 64 of a length less than that of the diameter thereof. The members 63, 64 are located adjacent to each side of the diametric center of the inner face of said body part 62. Holdfast devices 65 are employed for securing the guide members in position, and said guide members are in the form of angle-irons of the desired length. The body part 62 on its inner face is formed with a pair of spaced segmental shaped oppositely disposed stress flanges 66, 67 having their outer sides flush with the outer edge of said body part 62. One end of each of said flanges is flush with and the other end of each flange is spaced from an end of the diametric center of body part 62. That end of a flange which is flush with one end of said diametric center is spaced from that end of the other flange which is spaced from said diametric center. The arranging of the ends of the flanges 66, 67 in a manner as stated provide a pair of passages 68, 69, respectively, one arranged adjacent to one end and the other arranged adjacent to the other end of the said diametric center. The body part 62 is formed with a circular row of spaced openings 70. The inner face of body part 62 has a group of spaced centering pins 71.

The outer faces of the plates 60, 61 (Figures 1, 4 and 5) are integral axially thereof with the inner ends of the power shaft sections 36, 37, respectively. The plates 60, 61 in proximity to the shaft sections are formed with lubricant openings 72.

The plates 60, 61 are positioned against opposite sides of the body part 42 of the rotor 41. The centering pins 71 are extended into the sockets 53 and the stress flanges 66, 67 seated in the grooves 50 whereby the edges of plates 60, 61 are arranged inwardly adjacent the outer edge of the body part 42, and the tapped openings 51 brought into registry with the openings 70. Holdfast means 73 (Figure 1) are then extended through the openings 70 and threadedly engage with the tapped openings 51 so that the plates 60, 61 and body part 42 are anchored together and the rotor coupled to the shaft sections 36, 37 for simultaneously driving them. The arrangement of the openings 51, 70 for the holdfast means 73 is such that when the holdfast means 73 is driven home, the sections 43, 44 will be retained in the position (Figure 10) to provide the passages 45, 46 and that the plates 60, 61 will be so positioned relative to sections 43, 44 to have the passages 68, 69 register with the passages 45, 46 and with the front and rear of said registering passages closed. The lower portion of the rotor chamber 40 is formed into a pressure receiving space of uniform height by the rotor coacting with the portion 7 of largest radii.

Bodily carried with the rotor 41 (Figures 1, 2 and 3) is a reciprocatory driving structure 74 including a pair of oppositely disposed inner facewise opposed resiliently coupled vane parts 75, 76 of like form which are extendible through the passages 45, 46 (Figure 10) respectively, and travel between the members 63, 64 which provide a guide channel 77 (Figures 2, 3 and 4). Each vane comprises a rectangular body part 78 (Figures 12 and 13) formed with a rectangular opening 79 disposed lengthwise thereof. The opening 79 extends from a point in close proximity to the inner end edge 80 to a point beyond and in proximity to the transverse median of body part 78. The opening 79 forms a clearance for a purpose to be referred to. Between the transverse median and outer end of body part 78, the outer lengthwise edges 81 of the latter are formed with oppositely disposed pockets 83 of like form lengthwise thereof. Each pocket has its outer end wall 84 outwardly beveled; its inner end wall 85 concaved; and its base 86 (Figure 12) formed in proximity to the wall 84 with a socket 87.

Positioned within the pockets 83 (Figure 12) are oppositely disposed pressure applying members 88 of like form and each consists of a resilient metallic bar formed of a stretch 89 having an outwardly directed inner end terminal portion 90 and a stretch 91 disposed at right angles to the outer end of stretch 89. The stretches 89, 91 of the members 88, respectively, oppose the bases of the pockets 83 and extend into the sockets 87. Arranged within the pockets 83 are rectangular spring pressed oppositely disposed slidable blocks or tongues 92 constituting sealing means between a vane and the sides of chamber 40. The blocks 92 are of like form and have rounded inner ends 93 which are also beveled. The blocks 92 have beveled outer ends 94. The ends 93 are grooved as at 95. The blocks 92 bear against the members 88 and these latter permanently tend to maintain the blocks 92 against the side walls of chamber 40. The portions 90 of members 88 are seated in the grooves 95 and tend to maintain the outer ends of the blocks against the walls 84.

Formed integral with the inner face of body part 78 between the inner end wall 96 of opening 79 and the inner end edge 80 of said body part is a combined coupling and abutment part 97 which is flush with the wall 96 and edge 80. The part 97 is of a length less than the width of body part 78 and the width of opening 79. The part 97 has its ends spaced equi-distant from the side edges 81 of body part 78. Extending through the inner end of body part 78 and also the part 97 is an anchoring member 98 formed at its ends with the heads 99, 100. The member 98 extends from the outer face of body part 79 and also extends from the coupling part 97. The member 98 is disposed upon the lengthwise median of body part 78. The vanes are resiliently coupled together by a pair of coiled springs 101, 102. The ends 103 of the spring 101 are to be anchored to the member 98 inwardly adjacent the heads 99 and the ends 104 of the spring 102 are to be anchored to the members 98 inwardly adjacent the heads 100 when the structure 74 is assembled. The springs 101, 102 also function for another purpose to be referred to.

When the driving structure 74 is set up, the abutment part 97 of vane 75 is extended into the opening 79 of vane 76 and is positioned against the outer end wall of such opening. The abutment part 97 of vane 76 is extended into the opening 79 of the vane 75 and is positioned against the inner end wall of such opening. The springs 101, 102 are anchored in the position referred to and function to maintain the abutment parts 97 against the outer end wall of one opening 79 and the inner end wall of the other opening 79 as shown in Figure 2. One of the abutment parts coacts with an end wall of one of the openings 79 to provide for the vanes being shifted together in one direction and the other abutment part coacts with an end wall of the other opening 79 to provide for the vanes being shifted together in the opposite direction. The outer ends of the vanes continuously traverse the endless surface on the inner face of the stator and are shifted by such surface. The vanes 75, 76 are successively acted upon by the fluid pressure supplied to the chamber and propelled to travel against the endless surface on the inner face of stator 1 and also against the inner faces of the side plates 9, 10 adjacent the body part of the coupling plates 60, 61.

The stator 1 is formed above its horizontal center with a pair of spaced parallel vertically disposed extensions 105, 106 disposed between the flanges 2, 3. The extensions 105, 106 are of like form and the description of one will apply to the other. With reference to Figures 2, 3 and 6, each of the said extensions is formed centrally of its top with an annular recess 107 and adjacent said recess with tapped openings 108. Leading from the recess 107 and opening into the upper portion of chamber 40 is a set of ports indicated at 109, 110 and 111. The port 109 is disposed centrally of the extension and is vertical. The ports 110, 111 are oppositely outwardly inclined with respect to the port 109. The ports of the extension 105 constitute an intake to chamber 40 for fluid pressure and the ports of the extension 106 constitute an outlet for chamber 40.

Leading to the extension 105 is a fluid pressure intake pipe 112 which has its lower end 113 arranged in recess 107 of extension 105. The pipe 112 adjacent its lower end is provided with an apertured flange 114 which seats on the top of extension 105. The upper end of pipe 112 opens into and is integral with a casing 115. Leading from the extension 106 is a discharge pipe 116 having its lower end 117 seated in the recess 107 of the extension 106. The pipe 116 adjacent its lower end is provided with an apertured flange 118 which seats upon the top of extension 106. The flanges 114 and 118 are secured to the extensions 105, 106 in a manner as shown in Figure 6 by the holdfast means 119. The pipe 116 is integral at its upper end with the casing 115 and also opens into the latter. The casing 115 has a fluid pressure supply intake 120 adapted to communicate with the source of supply, such, by way of example, would be steam. An exhaust or discharge outlet is indicated at 121 and which extends from and is an integral part of a revoluble controlling valve 122 of the tapered plug type. The outlet 121 communicates through valve 122 with the pipe 116. The valve 122 has a port 123 for communication with the pipe 112 and a port 124 for communication with the pipe 116. The port 124 opens into the discharge outlet 121. The casing 115 provides a chamber 125 for the valve 122. The wall 127 of chamber 125 is tapered throughout. The valve 122 has a part 126 of uniform diameter and a tapered part 126ᵇ extending from and of greater length than part 126. The parts 126, 126ᵇ of valve 122 are encompassed respectively by the wall 127 of chamber 125. The part 126 extends outwardly beyond one end of the wall 127 of the chamber 125 and is formed with a diametrically disposed groove 122ᶜ in which is arranged a handle means 128 of a length greater than the diameter of casing 115. The casing 115 (Figure 3) at its edge 122ᵈ is formed with spaced stops 122ᵉ to provide for the handle means 128 being arrested at the desired point to cause the ports 123 and 124, respectively, to be properly positioned for supply and exhaust with respect to the pipes 112 and 116. The handle means 128 is fixedly secured to part 126 of valve 122, as at 128ᵃ. The outlet 121 is provided by a peripherally threaded nipple 129 forming an integral extended part at the smallest end of the valve 122. Carried by the nipple 129 is an interiorly threaded flanged collar 130 engaging with the threads of the nipple 129 and pressing against the smallest end of chamber 125 for maintaining a snug sliding fit between valve 122 and the wall 127 of chamber 125. The collar 130 is bodily carried with valve 122 and provides for the adjusting of the latter relative to wall 127 to form a snug fit.

Although Figures 1, 2, 3 of the drawings illustrate the extension 105 to provide an intake means for the fluid pressure and the extension 106 an outlet for chamber 40, yet it is to be understood that the extension 106 may be employed as an intake and extension 105 as an outlet. The inner ends of the ports of the extensions 105, 106 open at the stepped portion 8 of the inner face of the stator 1. The ports are main ports and open into the chamber 40 at the desired distance from the point of mergence of the steps 8 with the part 6 of smallest radii that there full capacity is had.

The ports 109, 110 and 111 are termed main ports and each may have associated therewith one or more relief or auxiliary ports which extend from the main ports and open into chamber 40 at the steps 8. In Figure 3 the relief or auxiliary ports are indicated at 111ᵃ. The ports 111ᵃ are always open close to the part 6 of smallest radii. The ports 111ᵃ would not be used when the adaptation of the invention is had with respect to internal combustion engines, air compressors, air motors or vacuum pumps, but they would be used in steam and all fluid handling units. A unit requiring relief ports and not having them would act the same way as a regular piston pump or engine would if its ports were closed too soon causing back pressure or hamering, as all of its capacity could not be expelled. The main ports may be as far out on the steps 8 as the vane will permit without opposite main ports being uncovered at the same time by the vane in the lower part of the stator.

The outer ends of the vanes are chambered or oppositely beveled as at 130ᵃ. The steps 8 on the inner face of stator 1 are never diametrically opposite. The steps 8 on the inner face of stator require a definite procedure in their development, and as stated are never diametrically opposite, even though the vanes are diametrically opposite and both vanes move in and out simultaneously. Both vanes must be considered in the development of the steps 8. The point of contact between the vanes and the steps is not the center line of the vanes, but is always above or closer to the part of smallest radii than the dead center of the latter. This is due to the fact that the vanes contact, slightly in from their side faces the steps 8 and this is due by the beveled or chambered outer end of the vanes. If the vane were of one piece construction, from step to step the contact points on the steps would not be diametrically opposite, unless the vanes were beveled sharply on both sides and brought to a knife edge on their center line, whereby the greater the thickness of the vanes causes the contact point on the steps to be closer to the part of smallest radii than the dead center of the part of smallest radii. The fact that the vanes are face to face makes a still greater distance between these centers as is substantiated with reference to the inner face 130ᵇ of stator 1 as shown in Figure 20 and the application of the vane template 130ᶜ shown in Figure 19.

The following explanation with reference to the template 130ᶜ and the inner face 130ᵇ of stator 1 will make clear the matter set forth by the preceding paragraph. First establish a 2″ radius as designated L. Second establish a 2½″ radius as designated M. Third established a 2¼" radius as designated N, and the latter provides equal divisions between L and M. Fourth establish line O and which may be located at any point. Fifth establish line P by drawing a line where line O and radius N intersects to radius L. Sixth establish an elliptically developed curved line Q by using template 130c of a pair of vanes having a total length equal to the distance from small radius L to large radius M, cross center, hold the contact point R designated Keep on tangent on line P at the point where line P meets small radius L. Keep center line S, designated Keep on dead center of template 130c on dead center of small radius L and spot in on opposite side at point T, designated Spot in for curved part of template 130c, move end on line P about one eighth of an inch down from first point and keep center line of template 130c on dead center and spot in again, repeat this operation until a spot intersects radius N. From spot intersecting radius N draw line U to radius L and in a manner, as stated heretofore establish elliptically curved line V by spotting in from line U, then fair both curved parts out over spots and draw line W from the spot intersecting on radius N across dead center. Where lines O and W intersect on radius L establish arcs X, Y, then draw line Z across dead center to where arc X, Y, intersect for true center.

From the foregoing it may be readily seen that there is a true working center of the vanes where they contact steps 8, that is above or nearer the small radius 6 than the dead center of radius 6.

Referring to Figures 16, 17 and 18, a modified form of power unit of the rotor type is illustrated and which is of the same form as that shown by Figure 1, with this exception, that a pair of oppositely disposed rotor driving structures 131, 132 are employed in lieu of one. The driving structure 131 is of the same construction as the rotor driving structure 74 and includes a pair of oppositely disposed resiliently coupled interengaged vanes 133, 134 of the same form and arrangement as the vanes 75, 76. The rotor driving structure 132 consist of a pair of oppositely disposed vanes 135, 136 of like form and which have intermediate portions of reduced width slidably extending through the openings 137 in vanes 133, 134. The vane 135 or the vane 136 includes a body part 138 formed with a rectangular opening 139 and a like cutout 140 in each outer lengthwise edge thereof to provide the shoulders 141, 142 and the intermediate portions of reduced width. The body parts 138 of the vanes 135, 136 have their inner faces formed with combined coupling and abutment parts 143 which extend into the openings 139. The parts 143 are arranged relative to the openings 139 in the same manner as the abutment parts 97 of vanes 75, 76 are arranged relative to openings 79 in vanes 75, 76. The parts 143 function in a manner similar to that of parts 97. The body part 138 of the vane 135 or the vane 136 is provided with a pair of spaced parallel anchoring members 144 which extend through the part 143 of the vane. Each member 144 is of the same form and arranged as that of a member 98 (Figures 12 and 14. The heads of each member 144 are indicated at 145, 146. The vanes 135, 136 are resiliently coupled together by two pairs of springs. The springs of one pair are indicated at 147 and those of the other pair at 148. The ends of the springs 147 are anchored to the members 144 inwardly adjacent the heads 145. The ends of the springs of the other pair are anchored to the members 144 inwardly adjacent the heads 146. The springs 147 function in the same manner as the springs 101, 102. Otherwise than that as stated the vanes 135, 136 will be constructed in the same manner as the vanes 74, 75, 133, 134. As the rotor driving unit 132 shown in Figure 16 is provided with four vanes, the rotor 149 will be formed of four spaced sections 150, 151, 152 and 153 between which the vane elements reciprocate. The sections of rotor 149 will be formed in the same manner as the sections of the rotor 42 (shown in Figures 10 and 11). The rotor 149 will include side plates corresponding to plates or members 60, 61 (Figures 4 and 5), but which will be so formed and arranged as to provide for the guiding and to permit of the reciprocation of the four vanes of the driving structure 132. Otherwise than that as stated, the form of the rotor driving unit 132 shown in Figure 16 will be the same as that shown in Figure 1.

The stator may be of any diameter, thickness or length desired, constructed with the greatest part of interior circumference to two different radii, the smallest radii 6 being oppositely disposed with respect to the largest radii 7. The remaining part of the interior circumference of the stator is formed of a pair of tangent portions and a pair of irregularly curved portions. The tangent portions begin in a point on the portion of smallest radii determined by the number of vanes which are employed. The irregular portions continue from the ending of the tangent portions to intersect with the portion of largest radii 7. The stepped portions 8 referred to are formed from the tangent and irregularly curved portions. The portion of largest radii 7 has its ends merge into the irregular curved portions, and the tangent portions merge into the ends of the portions of smallest radii. The proportion of the inner face of the stator may be determined as follows: After the diameter of the rotor is decided, take half the diameter of the rotor for the thickness of the rotor and the thickness of the stator. The rotor should be about .004 of an inch thinner than the stator. Allow one-eighth of an inch for each inch of the diameter of the rotor and add it to the rotor radius and this gives the largest radius. The tangent and curved portions are determined by the number of vanes desired or used. Any of the designs of units as shown will operate as a power unit, compressor, vacuum pump, water pump, fuel or oil pump, gas or oil burner, but proper designing will determine the degree of efficiency delivered. There should be, however, about .004 of an inch clearance between the rotor and the portion of smallest radii. The stator 1 encloses the rotor.

The unit includes a stator of uniform thickness with inlet and outlet ports and having a major part of its inner surface upon two oppositely disposed radii and two stepped or irregular surfaces connecting the two radii into one continuous surface. The starting point or where the steps leave the smallest radii to where they end or intersect the largest radii constitutes a fulcrum point or cylinder head. The largest radii between the step intersections constitutes the outer cylinder wall. The smallest radii conforms closely to the diameter of the rotor and constitutes a neutral portion on which the vanes travel in a receded position as the rotor revolves and when the vanes move over the steps to the largest radii, they will be in position to perform work.

The difference between the radii may vary according to speed, volume or pressure desired. The location or beginning and ending of steps must be opposite and of like structure as per tangent and elliptic curved portion developed by the vanes when positive outward movement of the vanes is desired in connection with the use of abutment blocks 97. The inner face of the stator should be so constructed that the vanes make a complete revolution without altering their relative positions and move in and out at exactly the same time and together. The construction of the unit is such that it will start from any position with full load, with no dead center.

The power unit may be used as a water engine or fluid pump, hereinafter referred to as a motor or pump, and it provides for a motor having large capacity in small space; that can be rotated in either direction with equal power; that will start in any position with full load; that can be operated at high or low speed; with ports placed in line of centrifugal force; so designed that fluids enter and leave unit with about as little friction and change of course as possible; and using fluids or water in a hydraulic way, as in piston type, and also the turbine principle of speed. It also provides for a pump having a large capacity in small space; that can be rotated in either direction with equal output; delivering a steady flow; that needs no check valves; that keeps fluids moving as steadily as a centrifugal pump; that has a suction lift greater than a piston pump because none of the load lifted or started, "slides back" as is the case in piston strokes, and one with much greater output than a piston pump on same power input.

The power unit may be used as an air motor that has great power in small space; that will start from any position under full load; that can be built extremely light but very powerful; that can be reversed or run in either direction with equal power; that can be run at high or low speeds; that will operate more efficiently than an electric motor in driving individual machines, as it can be reversed and run at any desired speeds as required by operator and stalling would cause no damage; that has more flexibility than an electric motor; that has more power per pound of weight than an electric motor; that would cost less per power to manufacture; that would cost less than an electric motor to operate; that would cost less than an electric motor to install; that would eliminate hazards, such as fires from overheating, overloading, blown fuses, burned wires and contacts; which has a low upkeep; and one suitable for portable grinders, drills, sanders, etc.

The power unit may be used as an air or gas compressor having large capacity in small space; that can be rotated in either direction with equal output; with ports so placed that it evacuates practically 100%; with a steady output and suction; requiring no check valves, (unless a built-up pressure is required); that can operate at high or low speed; 100% more efficient than a piston type compressor at gage pressures; moving more volume per pound of weight than a piston type compressor; moving from 100% to 150% more volume than a piston type compressor on same power input; with more capacity per bulk cubic inch displacement than a piston type; that can be used as a super-charger; that could be jacketed and superheat mixtures delivered; and one that can have spring tension on vanes so adjusted to deliver pressure up to desired point and slip by vanes (as is accomplished in a bypass) and will not stall. It also provides for a vacuum pump evacuating practically 100%; with a steady suction; exhausting practically 100%; that requires no checks (unless vacuum is to be maintained); that will evacuate 100% more efficiently than a piston type and a vacuum pump or compressor fitted with a control valve (as on engine); made to change intake and output in alternate directions or stop flow at will by shifting control valve while compressor is in full operation.

The vanes have their inner ends extend in past the center of the shaft, and their inner ends may be reduced or increased in weight to effect a counterbalance as desired, and thereby make the load on stator inner wall produced by centrifugal force of the vanes, heavy or light as desired.

What I claim is:

1. In a power unit, a revoluble power transmitting rotor, a reciprocatory pressure propelled two-part driving structure for and slidably carried by the rotor, each of said parts extending through the other part in proximity to the inner end of the latter, and means encompassing the rotor acting on the outer end of each of said parts for reciprocating said structure during the revolving of the rotor.

2. In a power unit, a revoluble power transmitting rotor, a reciprocatory pressure propelled two-part driving structure for and slidably carried by the rotor, each of said parts extending through and abutting the other part in proximity to the inner end of the latter, means encompassing the rotor acting on the outer ends of said parts for reciprocating said structure during the revolving of the rotor, said parts being resiliently connected by tensioning springs and disposed in offset relation and said rotor being provided therein with offset guides for said parts.

3. In a power unit, a revoluble power transmitting rotor, a reciprocatory pressure propelled two-part driving structure for and slidably carried by the rotor, each of said parts extending through the other part in proximity to the inner end of the latter, and means encompassing the rotor acting on the outer ends of each of said parts for reciprocating said structure during the revolving of the rotor, said parts being disposed in offset relation, said rotor being formed with a pair of non-aligned passages for said parts.

4. The invention as set forth in claim 1 having the two parts of said structure formed of a pair of oppositely disposed flat, rectangular, apertured, interengaged, inner facewise opposed and inwardly abutting vanes, said vanes being resiliently coupled together in inwardly abutting relation.

5. In a power unit a rotor including a plurality of segment-shaped sections arranged in endwise opposed relation forming non-aligned passages, each of said sections having both faces formed with inner and outer grooves, said outer grooves for receiving wear compensating means, coupling plates secured to both faces of said sections for maintaining them in spaced relation and provided with stress lugs extending into said inner grooves, and a pressure operated operating structure for said rotor reciprocating through said passages.

6. In a power unit, a stator providing a rotor chamber having an endless wall formed of two different radii connected together by oppositely disposed steps, a revoluble power transmitting rotor operating in said chamber, a reciprocatory pressure propelled two part driving structure for and slidably carried by the rotor and for permanent contact with said wall, each of said parts extending through the other in proximity to their inner ends, the said different radii and steps of said wall forming a uniform diametrical distance throughout the inner circumference of the stator where said parts contact said wall, and said parts having coacting interengageable means for keeping them in positive and permanent contact with said wall at diametrically opposite points of the latter during revolving of the rotor.

GEORGE W. WHITEHURST.